No. 851,664. PATENTED APR. 30, 1907.
R. P. JACKSON.
SYSTEM OF CONTROL.
APPLICATION FILED APR. 13, 1905.
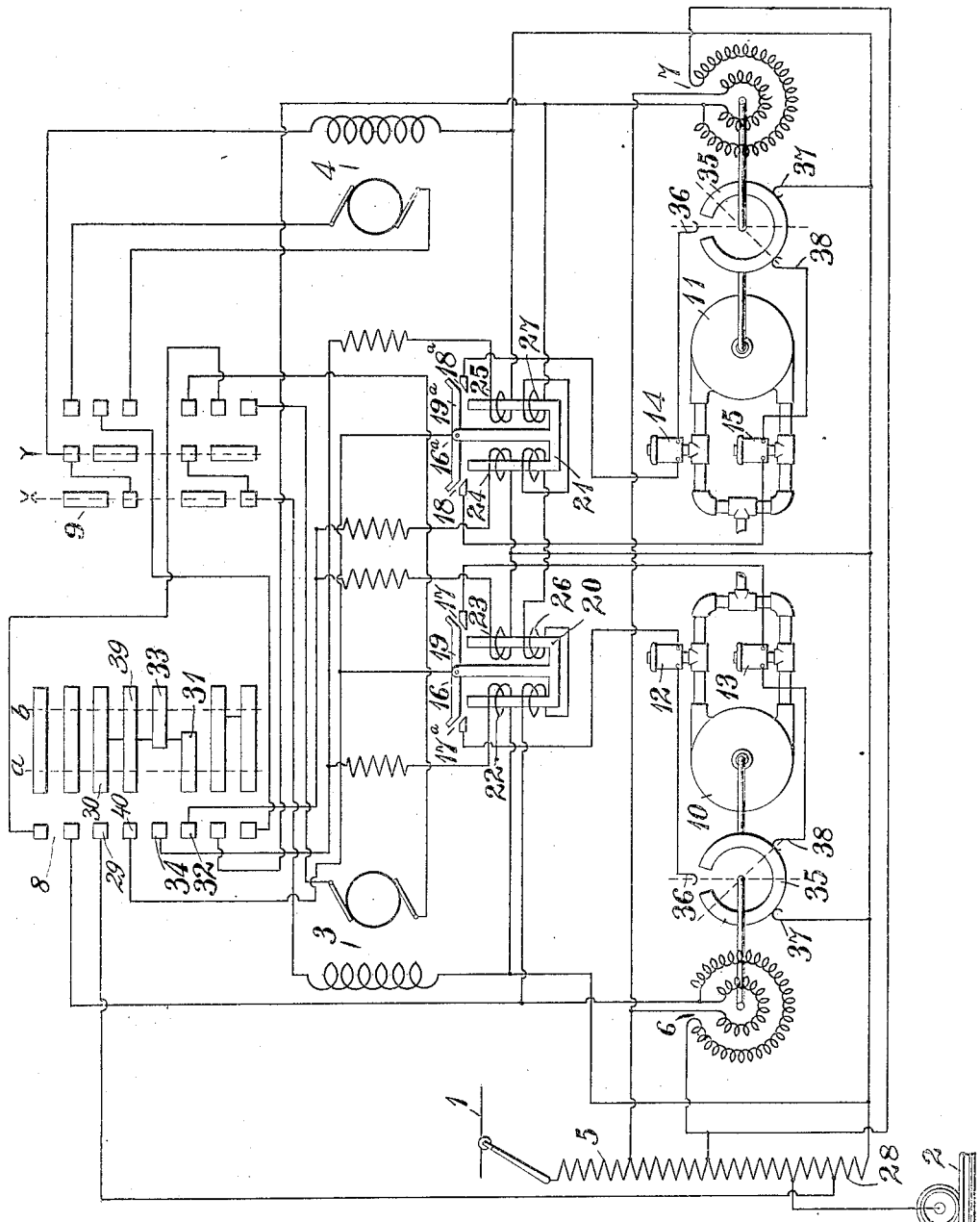
WITNESSES:
Fred H. Miller
R. J. Dearborn.
INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

No. 851,664.     Specification of Letters Patent.     Patented April 30, 1907.

Application filed April 13, 1905. Serial No. 255,440.

*To all whom it may concern:*

Be it known that I, RAY P. JACKSON, a citizen of the United States, and a resident of Wilkinsburg, in the county of Allegheny and State of Pennsylvania, have invented a new and useful Improvement in Systems of Control, of which the following is a specification.

My invention relates to systems of control for electric motors, and particularly to such systems as embody voltage regulating devices.

The object of my invention is to provide means for causing two or more voltage regulators to operate synchronously; that is, so that all of the regulators will supply approximately the same voltage to the motors or other translating devices.

When two or more railway vehicles that are each provided with motors and voltage regulators are connected to form a train, or when it is expedient or necessary to provide a single vehicle with two voltage regulators, it is desirable that all of the motors be supplied with approximately the same voltage, in order that they may operate at the same speed and develop the same torque. My invention provides means for causing equalization of the potentials at the terminals of all of such motors.

The single figure of the accompanying drawing illustrates a system embodying my invention.

Alternating current is supplied from a trolley conductor 1 and a track rail 2 to motors 3 and 4 through a lowering transformer winding 5, voltage regulators 6 and 7, a controlling switch 8 and a reversing switch 9. The voltage regulators 6 and 7 may be of the form described in Patent No. 765,185, granted to the Westinghouse Electric & Manufacturing Company, July 19th, 1904, upon an application filed by Benjamin G. Lamme, or they may be of any other suitable form. The voltage regulators may be operated by means of pneumatic motors 10 and 11, the supply of the operating fluid thereto being governed by means of magnet windings 12, 13, 14 and 15, or they may be operated by any other suitable means, such as an electric motor the circuits of which may be governed by the magnet windings 12, 13, 14 and 15.

The circuits of the controlling windings are governed by means of relay devices 16 and 16$^a$, which respectively embody two-way switches 17 and 17$^a$ and 18 and 18$^a$. The movable contact terminals of the switches 17 and 17$^a$ are mounted upon a pivotally supported armature 19 and the corresponding contact terminals of the switches 18 and 18$^a$ are mounted upon a similar armature 19$^a$. The magnetizable cores 20 and 21, upon which the armatures are mounted, are provided, respectively, with windings 22 and 23 and with windings 24 and 25 for normally controlling the operation of the armatures 19 and 19$^a$, and with magnet windings 26 and 27 that may be connected between the terminals of the motors 3 and 4 or between corresponding points in the circuits of the motors and that may act either in opposition to or in conjunction with one or more of the windings 22, 23, 24 and 25.

When it is desired to increase the voltage applied to the motors 3 and 4, the windings 23 and 24 are energized and the switches 17 and 18 are closed, thereby completing the circuits of the magnet windings 13 and 15 and causing the voltage regulators to operate in the forward direction. If the voltage supplied to one of the motors exceeds that supplied to the other, the windings 26 and 27 will be energized and one will oppose and the other act in conjunction with one or the other of the windings 23 and 24, so that one or the other of the switches 17 and 18 is opened and the voltage regulator which is delivering the highest voltage to its corresponding motor is stopped until there is no difference of potential between the terminals of the motor or between the points in the motor circuits to which the windings 26 and 27 are connected. For instance, if the voltage applied to the motor 3 exceeds that applied to the motor 4, a current will traverse windings 26 and 27 and the magnetizing action of the winding 23 will be neutralized by that of the winding 26 and the switch 17 will open while the winding 27 acts in conjunction with the winding 24 and the switch 18 is maintained in its closed position. As soon as the voltage supplied to the motor 4 equals that supplied to the motor 3, the current through the windings 26 and 27 dies out and the winding 23 again effects closure of the switch 17.

The switches 17$^a$ and 18$^a$ that are operated by means of the windings 22 and 25 control the circuits of the magnet windings 12 and 14, which govern the movement of the voltage regulators from the high voltage positions to the low voltage positions. The operation of the relay device, when the voltage applied to the motors is being decreased, is similar to that just described when the voltage is being increased and the voltages applied to the motors differ.

When the controlling switch 8 occupies position a, a circuit is established through a small portion 28 of the main transformer winding 5, contact finger 29, drum segments 30 and 31, contact finger 32, windings 23 and 24 of the relay devices 16 and 16ª, which will be opereatd to establish circuits from the transformer 5 through the contact finger 29, drum segments 30 and 39, contact finger 40, switches 17 and 18, magnet windings 13 and 15, contact fingers 38, rings 35, and contact fingers 37 back to the transformer 5. The voltage regulators will then be moved from low voltage to high voltage positions. If, when the regulators occupy high voltage positions, the switch 8 is moved in the opposite direction to position b, a circuit will be established through the small portion 28 of the transformer winding 5, contact finger 29, drum segments 30 and 33, contact finger 34 and the windings 22 and 25. The devices 16 and 16ª will thereupon be operated to establish circuits from the transformer 5, through contact finger 29, drum segments 30 and 39, contact finger 40, switches 17ª and 18ª, magnet windings 12 and 14, contact fingers 36, rings 35 and contact fingers 37 to the transformer 5, and the voltage regulator is then moved from high voltage to low voltage positions.

The circuits of the magnet windings 12, 13, 14 and 15 are further controlled by means of interlocking switches, each of which comprises a conducting segment 35 that is carried upon the shaft of the regulator-operating means, and brushes 36, 37 and 38. When the regulator occupies the positions shown, it is in its lowest voltage position and circuits can be established only through the magnet windings 13 and 15 which control the supply of voltage for forward operation of the regulator, but the circuits of the windings 13 and 15 are interrupted when the regulator has been moved to such a position that the finger 37 is disengaged from the conducting segment 35 by its having been brought opposite the open portion in this segment. When the regulator has been moved from its lowest voltage position only a slight amount, the brush 36 comes into engagement with the conducting segment 35 and the windings 12 and 14 may then be energized when it is desired to again return to the lowest voltage position of the regulator. The interlocking switches also serve to limit the extent of movement of the voltage regulator by interrupting the circuits of the windings 12, 13, 14 and 15 when the high and low voltage positions have been reached.

While I have shown the voltage regulators as connected to a single transformer 5, it is evident that they may be connected to separate transformers and that they may be otherwise modified in construction and arrangement, if desired.

Other details of connections and arrangements of parts, as well as details of construction of the relay devices 16 and 16ª, the voltage regulators, the interlocking devices operated thereby, and the regulator-operating means may be considerably varied from what is here specifically shown and described without departing from the spirit of the invention.

I claim as my invention:

1. The combination with a plurality of translating devices, a plurality of voltage regulators, and means for operating the same, of relay devices for governing said operating means having windings that are connected between corresponding points in the circuits of the translating devices, and windings that normally govern the operation of the relay devices.

2. The combination with a plurality of translating devices, a plurality of voltage regulators, and means for operating the same, of means for governing said operating means having windings that are connected between corresponding points in the circuits of the translating devices, and windings that normally control the operation of the governing means.

3. The combination with a plurality of translating devices, a plurality of voltage regulators, and means for operating the same, of relay devices comprising switches, magnetizable cores, windings that normally control the operation of the relay devices, and windings that are connected between corresponding points in the circuits of the translating devices.

4. The combination with a plurality of electrical translating devices and a plurality of voltage regulators, of means for operating the voltage regulators to supply the same voltage to all of the translating devices.

5. The combination with a plurality of electrical translating devices and a plurality of voltage regulators, of means for operating the voltage regulators, and means for automatically causing the regulators to supply the same voltage to all of the translating devices.

6. The combination with a plurality of electrical translating devices and a plurality of voltage regulators, of means for operating the voltage regulators and means for automatically governing the operating means whereby the regulators are caused to supply the same voltage to all of the translating devices.

7. The combination with a plurality of translating devices, a plurality of voltage regulators, and means for operating the same, of means for governing said operating means having windings that normally control the operation thereof and windings that are connected between corresponding points in the circuits of the translating devices and the magnetizing effects of which oppose and supplement, respectively, those of the other windings.

In testimony whereof, I have hereunto subscribed my name this 11th day of April, 1905.

RAY P. JACKSON.

Witnesses:
JOHN D. PATON,
BIRNEY HINES.